(12) United States Patent
Hsia

(10) Patent No.: US 11,330,688 B2
(45) Date of Patent: May 10, 2022

(54) SOLID-STATE LIGHTING WITH REDUCED LIGHT FLICKERING

(71) Applicant: Aleddra Inc., Renton, WA (US)

(72) Inventor: Chungho Hsia, Bellevue, WA (US)

(73) Assignee: Aleddra Inc., Renton, WA (US)

( * ) Notice: Subject to any disclaimer, the term of this patent is extended or adjusted under 35 U.S.C. 154(b) by 0 days.

(21) Appl. No.: 17/502,029

(22) Filed: Oct. 14, 2021

(65) Prior Publication Data

US 2022/0039234 A1 Feb. 3, 2022

Related U.S. Application Data

(63) Continuation-in-part of application No. 17/405,203, filed on Aug. 18, 2021, now Pat. No. 11,283,291, which is a continuation-in-part of application No. 17/329,018, filed on May 24, 2021, which is a continuation-in-part of application No. 17/313,988, filed on May 6, 2021, now Pat. No. 11,264,831, which is a continuation-in-part of application No. 17/213,519, filed on Mar. 26, 2021, now Pat. No. 11,271,422, which is a continuation-in-part of application No. 17/151,606, filed on Jan. 18, 2021, now Pat. No. 11,259,386, which is a
(Continued)

(51) Int. Cl.
*G05F 1/00* (2006.01)
*H05B 45/36* (2020.01)
*H05B 45/12* (2020.01)
*H05B 45/14* (2020.01)
*H05B 45/375* (2020.01)

(52) U.S. Cl.
CPC ............. *H05B 45/36* (2020.01); *H05B 45/12* (2020.01); *H05B 45/14* (2020.01); *H05B 45/375* (2020.01)

(58) Field of Classification Search
CPC ...... H05B 45/36; H05B 45/355; H05B 45/12; H05B 45/14; H05B 45/375; H05B 47/18; H05B 45/30; H05B 45/38; H05B 45/00
USPC ........ 315/200 R, 307, 127, 185 R, 186, 193, 315/209 R, 224, 291, 294, 308, 320, 360; 363/17, 80, 89
See application file for complete search history.

(56) References Cited

U.S. PATENT DOCUMENTS

2011/0227489 A1* 9/2011 Huynh .................. H05B 45/30
  315/185 R
2012/0081032 A1* 4/2012 Huang ................ H05B 45/375
  315/294

FOREIGN PATENT DOCUMENTS

WO WO-2008152565 A2 * 12/2008 ......... H05B 33/0815

* cited by examiner

*Primary Examiner* — Omar Rojas Cadima
(74) *Attorney, Agent, or Firm* — Han IP PLLC; Andy M. Han

(57) ABSTRACT

An LED luminaire comprising LED arrays, a buck circuit with a switching portion comprising a transformer, and an LED driving circuit comprising a feedback control circuit is used to replace a conventional luminaire with a severe temporal light artifact. The buck circuit with the switching portion is configured to generate a variable DC voltage with a low-frequency ripple associated with AC mains. The feedback control circuit is configured to feedback a mixed voltage and current control signal to the buck circuit with the switching portion to compensate the low-frequency ripple so as to regulate an LED driving voltage with a ripple-reduced LED current to drive the LED arrays with a flicker-reduced light emission that may protect users of the LED luminaire from possible health hazards such as seizures, headaches, eyestrain, reduced visual performance, migraines, etc.

14 Claims, 6 Drawing Sheets

Related U.S. Application Data continuation-in-part of application No. 17/122,942, filed on Dec. 15, 2020, now Pat. No. 11,265,991, which is a continuation-in-part of application No. 17/099,450, filed on Nov. 16, 2020, now Pat. No. 11,264,830, which is a continuation-in-part of application No. 17/076,748, filed on Oct. 21, 2020, now Pat. No. 11,271,388, which is a continuation-in-part of application No. 17/026,903, filed on Sep. 21, 2020, now Pat. No. 11,271,421, which is a continuation-in-part of application No. 17/016,296, filed on Sep. 9, 2020, now Pat. No. 11,259,374, which is a continuation-in-part of application No. 16/989,016, filed on Aug. 10, 2020, now Pat. No. 11,122,658, which is a continuation-in-part of application No. 16/929,540, filed on Jul. 15, 2020, now Pat. No. 11,116,057, which is a continuation-in-part of application No. 16/904,206, filed on Jun. 17, 2020, now Pat. No. 11,102,864, which is a continuation-in-part of application No. 16/880,375, filed on May 21, 2020, now Pat. No. 11,172,551, which is a continuation-in-part of application No. 16/861,137, filed on Apr. 28, 2020, now Pat. No. 10,992,161, which is a continuation-in-part of application No. 16/830,198, filed on Mar. 25, 2020, now Pat. No. 10,869,373, which is a continuation-in-part of application No. 16/735,410, filed on Jan. 6, 2020, now Pat. No. 10,660,179, which is a continuation-in-part of application No. 16/694,970, filed on Nov. 25, 2019, now Pat. No. 10,602,597, which is a continuation-in-part of application No. 16/681,740, filed on Nov. 12, 2019, now Pat. No. 10,959,310, which is a continuation-in-part of application No. 16/664,034, filed on Oct. 25, 2019, now Pat. No. 10,660,184, which is a continuation-in-part of application No. 16/572,040, filed on Sep. 16, 2019, now Pat. No. 10,645,782, which is a continuation-in-part of application No. 16/547,502, filed on Aug. 21, 2019, now Pat. No. 10,485,073, which is a continuation-in-part of application No. 16/530,747, filed on Aug. 2, 2019, now Pat. No. 10,492,265, which is a continuation-in-part of application No. 16/458,823, filed on Jul. 1, 2019, now Pat. No. 10,485,065, which is a continuation-in-part of application No. 16/432,735, filed on Jun. 5, 2019, now Pat. No. 10,390,396, which is a continuation-in-part of application No. 16/401,849, filed on May 2, 2019, now Pat. No. 10,390,395, which is a continuation-in-part of application No. 16/296,864, filed on Mar. 8, 2019, now Pat. No. 10,390,394, which is a continuation-in-part of application No. 16/269,510, filed on Feb. 6, 2019, now Pat. No. 10,314,123, which is a continuation-in-part of application No. 16/247,456, filed on Jan. 14, 2019, now Pat. No. 10,327,298, which is a continuation-in-part of application No. 16/208,510, filed on Dec. 3, 2018, now Pat. No. 10,237,946, which is a continuation-in-part of application No. 16/154,707, filed on Oct. 8, 2018, now Pat. No. 10,225,905, which is a continuation-in-part of application No. 15/947,631, filed on Apr. 6, 2018, now Pat. No. 10,123,388, which is a continuation-in-part of application No. 15/911,086, filed on Mar. 3, 2018, now Pat. No. 10,136,483, which is a continuation-in-part of application No. 15/897,106, filed on Feb. 14, 2018, now Pat. No. 10,161,616, which is a continuation-in-part of application No. 15/874,752, filed on Jan. 18, 2018, now Pat. No. 10,036,515, which is a continuation-in-part of application No. 15/836,170, filed on Dec. 8, 2017, now Pat. No. 10,021,753, which is a continuation-in-part of application No. 15/649,392, filed on Jul. 13, 2017, now Pat. No. 9,986,619, which is a continuation-in-part of application No. 15/444,536, filed on Feb. 18, 2017, now Pat. No. 9,826,595, which is a continuation-in-part of application No. 15/362,772, filed on Nov. 28, 2016, now Pat. No. 9,967,927, which is a continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

SOLID-STATE LIGHTING WITH REDUCED LIGHT FLICKERING

CROSS-REFERENCE TO RELATED APPLICATIONS

The present disclosure is part of a continuation-in-part (CIP) application of U.S. patent application Ser. No. 17/405,203, filed 18 Aug. 2021, which is part of CIP application of U.S. patent application Ser. No. 17/329,018, filed 24 May 2021, which is part of CIP application of U.S. patent application Ser. No. 17/313,988, filed 6 May 2021, which is part of CIP application of U.S. patent application Ser. No. 17/213,519, filed 26 Mar. 2021, which is part of CIP application of U.S. patent application Ser. No. 17/151,606, filed 18 Jan. 2021, which is part of CIP application of U.S. patent application Ser. No. 17/122,942, filed 15 Dec. 2020, which is part of CIP application of U.S. patent application Ser. No. 17/099,450, filed 16 Nov. 2020, which is part of CIP application of U.S. patent application Ser. No. 17/076,748, filed 21 Oct. 2020, which is part of CIP application of U.S. patent application Ser. No. 17/026,903, filed 21 Sep. 2020, which is part of CIP application of U.S. patent application Ser. No. 17/016,296, filed 9 Sep. 2020, which is part of CIP application of U.S. patent application Ser. No. 16/989,016, filed 10 Aug. 2020 and issued as U.S. Pat. No. 11,122,658 on 14 Sep. 2021, which is part of CIP application of U.S. patent application Ser. No. 16/929,540, filed 15 Jul. 2020 and issued as U.S. Pat. No. 11,116,057 on 7 Sep. 2021, which is part of CIP application of U.S. patent application Ser. No. 16/904,206, filed 17 Jun. 2020 and issued as U.S. Pat. No. 11,102,864 on 24 Aug. 2021, which is part of CIP application of U.S. patent application Ser. No. 16/880,375, filed 21 May 2020, which is part of CIP application of U.S. patent application Ser. No. 16/861,137, filed 28 Apr. 2020 and issued as U.S. Pat. No. 10,992,161 on 27 Apr. 2021, which is part of CIP application of U.S. patent application Ser. No. 16/830,198, filed 25 Mar. 2020 and issued as U.S. Pat. No. 10,869,373 on 15 Dec. 2020, which is part of CIP application of U.S. patent application Ser. No. 16/735,410, filed 6 Jan. 2020 and issued as U.S. Pat. No. 10,660,179 on 19 May 2020, which is part of CIP application of U.S. patent application Ser. No. 16/694,970, filed 25 Nov. 2019 and issued as U.S. Pat. No. 10,602,597 on 24 Mar. 2020, which is part of CIP application of U.S. patent application Ser. No. 16/681,740, filed 12 Nov. 2019 and issued as U.S. Pat. No. 10,959,310 on 23 Mar. 2021, which is part of CIP application of U.S. patent application Ser. No. 16/664,034, filed 25 Oct. 2019 and issued as U.S. Pat. No. 10,660,184 on 19 May 2020, which is part of CIP application of U.S. patent application Ser. No. 16/572,040, filed 16 Sep. 2019 and issued as U.S. Pat. No. 10,645,782 on 5 May 2020, which is part of CIP application of U.S. patent application Ser. No. 16/547,502, filed 21 Aug. 2019 and issued as U.S. Pat. No. 10,485,073 on 19 Nov. 2019, which is part of CIP application of U.S. patent application Ser. No. 16/530,747, filed 2 Aug. 2019 and issued as U.S. Pat. No. 10,492,265 on 26 Nov. 2019, which is part of CIP application of U.S. patent application Ser. No. 16/458,823, filed 1 Jul. 2019 and issued as U.S. Pat. No. 10,485,065 on 19 Nov. 2019, which is part of CIP application of U.S. patent application Ser. No. 16/432,735, filed 5 Jun. 2019 and issued as U.S. Pat. No. 10,390,396 on 20 Aug. 2019, which is part of CIP application of U.S. patent application Ser. No. 16/401,849, filed 2 May 2019 and issued as U.S. Pat. No. 10,390,395 on 20 Aug. 2019, which is part of CIP application of U.S. patent application Ser. No. 16/296,864, filed 8 Mar. 2019 and issued as U.S. Pat. No. 10,390,394 on 20 Aug. 2019, which is part of CIP application of U.S. patent application Ser. No. 16/269,510, filed 6 Feb. 2019 and issued as U.S. Pat. No. 10,314,123 on 4 Jun. 2019, which is part of CIP application of U.S. patent application Ser. No. 16/247,456, filed 14 Jan. 2019 and issued as U.S. Pat. No. 10,327,298 on 18 Jun. 2019, which is part of CIP application of U.S. patent application Ser. No. 16/208,510, filed 3 Dec. 2018 and issued as U.S. Pat. No. 10,237,946 on 19 Mar. 2019, which is part of CIP application of U.S. patent application Ser. No. 16/154,707, filed 8 Oct. 2018 and issued as U.S. Pat. No. 10,225,905 on 5 Mar. 2019, which is part of a CIP application of U.S. patent application Ser. No. 15/947,631, filed 6 Apr. 2018 and issued as U.S. Pat. No. 10,123,388 on 6 Nov. 2018, which is part of a CIP application of U.S. patent application Ser. No. 15/911,086, filed 3 Mar. 2018 and issued as U.S. Pat. No. 10,136,483 on 20 Nov. 2018, which is part of a CIP application of U.S. patent application Ser. No. 15/897,106, filed 14 Feb. 2018 and issued as U.S. Pat. No. 10,161,616 on 25 Dec. 2018, which is a CIP application of U.S. patent application Ser. No. 15/874,752, filed 18 Jan. 2018 and issued as U.S. Pat. No. 10,036,515 on 31 Jul. 2018, which is a CIP application of U.S. patent application Ser. No. 15/836,170, filed 8 Dec. 2017 and issued as U.S. Pat. No. 10,021,753 on 10 Jul. 2018, which is a CIP application of U.S. patent application of Ser. No. 15/649,392 filed 13 Jul. 2017 and issued as U.S. Pat. No. 9,986,619 on 29 May 2018, which is a CIP application of U.S. patent application Ser. No. 15/444,536, filed 28 Feb. 2017 and issued as U.S. Pat. No. 9,826,595 on 21 Nov. 2017, which is a CIP application of U.S. patent application Ser. No. 15/362,772, filed 28 Nov. 2016 and issued as U.S. Pat. No. 9,967,927 on 8 May 2018, which is a CIP application of U.S. patent application Ser. No. 15/225,748, filed 1 Aug. 2016 and issued as U.S. Pat. No. 9,743,484 on 22 Aug. 2017, which is a CIP application of U.S. patent application Ser. No. 14/818,041, filed 4 Aug. 2015 and issued as U.S. Pat. No. 9,420,663 on 16 Aug. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. Contents of the above-identified applications are incorporated herein by reference in their entirety.

BACKGROUND

Technical Field

The present disclosure relates to light-emitting diode (LED) luminaires and more particularly to an LED luminaire that includes a feedback control circuit to regulate an LED driving circuit to suppress light flickering which may possibly impact users' health.

Description of the Related Art

Solid-state lighting from semiconductor light-emitting diodes (LEDs) has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential health concerns such as temporal light artifacts become especially important and need to be well addressed.

In today's retrofit application of an LED luminaire to replace an existing fluorescent luminaire, consumers may choose either to adopt a ballast-compatible luminaire with an existing ballast used to operate the fluorescent luminaire or to employ an alternate current (AC) mains-operable LED luminaire by removing/bypassing the ballast. Either application has its advantages and disadvantages. In the former case, although the ballast consumes extra power, it is straightforward to replace the fluorescent luminaire without rewiring, which consumers have a first impression that it is the best alternative to the fluorescent luminaire. But the fact is that total cost of ownership for this approach is high regardless of very low initial cost. For example, the ballast-compatible luminaire works only with particular types of ballasts. If an existing ballast is not compatible with the ballast-compatible luminaire, the consumer will have to replace the ballast. Some facilities built long time ago incorporate different types of fixtures, which requires extensive labor for both identifying ballasts and replacing incompatible ones. Moreover, a ballast-compatible luminaire can operate longer than the ballast. When an old ballast fails, a new ballast will be needed to replace in order to keep the ballast-compatible luminaire working. Maintenance will be complicated, sometimes for the luminaires and sometimes for the ballasts. The incurred cost will preponderate over the initial cost savings by changeover to the ballast-compatible luminaire for hundreds of fixtures throughout a facility. When the ballast in a fixture dies, all the ballast-compatible luminaires in the fixture go out until the ballast is replaced. In addition, replacing a failed ballast requires a certified electrician. The labor costs and long-term maintenance costs will be unacceptable to end users. From energy saving point of view, the ballast constantly draws power, even when the ballast-compatible luminaires are dead or not installed. In this sense, any energy saved while using the ballast-compatible luminaire becomes meaningless with the constant energy use by the ballast. In the long run, the ballast-compatible luminaires are more expensive and less efficient than self-sustaining AC mains-operable luminaires.

On the contrary, an AC mains-operable luminaire does not require the ballast to operate. Before use of the AC mains-operable luminaire, the ballast in a fixture must be removed or bypassed. Removing or bypassing the ballast does not require an electrician and can be replaced by end users. Each AC mains-operable luminaire is self-sustaining. If one AC mains-operable luminaire in a fixture goes out, other luminaires or lamps in the fixture are not affected. Once installed, the AC mains-operable luminaire will only need to be replaced after 50,000 hours.

According to CIE 17.443 e-ILV, the temporal light artifact (TLA) is an undesired change in visual perception induced by a light stimulus whose luminance or spectral distribution fluctuates with time. A flicker, one of TLA, is a perception of visual unsteadiness for a static observer in a static environment. Furthermore, according to IEEE 1789-2015, flickers are variations in luminance over time (temporal modulation of light). The health impacts of flicker in LED lighting to consumers have seldom been discussed. Occasionally, when some conventional luminaires or lamps fail resulting in flicker, concurrently introducing seizures in the small percentage of the population that suffers from photosensitive epilepsy. Magnetically ballasted fluorescent lamps or luminaires have flicker issues identified to be related to migraines, headaches, reduced visual performance and comfort, and other possible neurological health issues. When high frequency electronic ballasts became popular, the flicker issues of fluorescent lamps or luminaires diminish. However, flicker component for such fluorescent lamps or luminaires is between 20% and 25%. For an incandescent lamp and a halogen lamp, the flicker frequency is 120 Hz, and the flicker component is between 15% up to 25%. Compact fluorescent lamps, as energy-saving lamps, have a flicker frequency in a range of 20 kHz to 150 kHz due to a built-in electronic power supply. The flicker component is between 20% and 40%. Since the brightness of LEDs responds instantaneously to an operating current, the flicker frequency and the flicker component depend on a driving current of a power supply used. The flicker component may be between 0% and 100%. The flicker frequency may be from 60 Hz to several hundred kHz, depending on a switching frequency of the power supply used to drive the LEDs. That is, for LED luminaires or lamps, the flicker is primarily determined by the power supply, and some possible health risks are associated with low-frequency modulation of the LEDs. In this case, an LED driving circuit in the power supply must be designed to modulate LED driving current at benign frequencies and to suppress the low-frequency flicker component in order to help protect against the health risks.

SUMMARY

An LED luminaire comprising one or more LED arrays, at least one full-wave rectifier, at least one input filter coupled to the at least one full-wave rectifier, a buck circuit with a switching portion of a buck circuit, and an LED driving circuit is used to replace a conventional luminaire with severe light flickering. The at least one full-wave rectifier is coupled to alternate-current (AC) mains and configured to convert a line voltage from the AC mains into a first direct-current (DC) voltage. The at least one input filter is configured to suppress an electromagnetic interference (EMI) noise.

The buck circuit with the switching portion comprises a first control device, a primary diode circuit, a first electronic switch configured to modulate the first DC voltage into a variable DC voltage at a switching frequency, a transformer comprising a primary winding and a secondary winding, and a first ground reference. The first electronic switch is controlled by the first control device with the switching frequency no less than 30 kHz.

The LED driving circuit comprises a second ground reference electrically isolated from the first ground reference, a feedback control circuit, and a first rectifier circuit and a second rectifier circuit both coupled to the secondary winding, wherein the first rectifier circuit and the second rectifier circuit are respectively configured to convert the variable DC voltage into a second DC voltage and a third DC voltage via the transformer. The second DC voltage is configured to produce a feedback control signal transmitted to the first control device via the feedback control circuit. The third DC voltage with a reduced low-frequency current ripple is configured to drive the one or more LED arrays with a flicker-reduced light emission. In the buck circuit with the switching portion, the first control device is configured to generate a zero current detection signal to control the first electronic switch on and off with a constant on-time and a varied off-time with a duty cycle controlling the third DC voltage and the LED driving current to drive the one or more LED arrays, in response to detecting zero current in the primary winding.

The feedback control circuit comprises an optocoupler circuit comprising an LED and a photo-transistor optically coupled to the LED. The LED comprises a cathode and is configured to convert the feedback control signal into a light signal whereas the photo-transistor is configured to convert the light signal into an electric signal. The optocoupler circuit is configured to provide an electrical isolation between the buck circuit with the switching portion and the LED driving circuit but to allow the feedback control signal to transmit. The feedback control circuit further comprises a second control device coupled to the optocoupler circuit and configured to abstract voltage and current variations associated with the second DC voltage and the third DC voltage and to send to the first control device via the optocoupler circuit to compensate and to control the variable DC voltage, thereby regulating the third DC voltage according to a predetermined LED driving voltage and a predetermined LED driving current.

The second control device comprises a first operational amplifier and a second operational amplifier. The first operational amplifier is configured to receive a first portion of the second DC voltage and to ultimately regulate the third DC voltage whereas the second operational amplifier is configured to receive a second portion of the second DC voltage and to ultimately regulate an LED driving current to drive the one or more LED arrays. Such double regulations of the third DC voltage and the LED driving current lead to an average current flowing in the secondary winding with the reduced low-frequency current ripple.

The feedback control circuit further comprises a first diode coupled to a first output of the first operational amplifier and a second diode coupled to a second output of the second operational amplifier. Each of the first diode and the second diode comprises an anode. The anode of the first diode and the anode of the second diode are electrically connected and further coupled to the cathode of the LED to control an electric current flowing in the LED.

The feedback control circuit is further configured to control the switching frequency and the duty cycle to compensate a low-frequency voltage ripple of the second DC voltage, consequently producing the third DC voltage with a ripple-reduced LED driving current to drive the one or more LED arrays. The LED driving circuit is further configured to drive the one or more LED arrays with the flicker-reduced light emission with a percent flicker less than 6% at a nominal flicker frequency of 100 Hz or 120 Hz.

The primary diode circuit is coupled between two terminals of the primary winding and configured to generate energy pulses in the primary winding and to yield the variable DC voltage with a constant current control. The LED driving circuit further comprises an output capacitor and a common-mode choke coupled between the output capacitor and the one or more LED arrays and configured to reduce a differential interference but to allow the LED driving current to pass and to operate the one or more LED arrays with the flicker-reduced light emission.

The feedback control circuit further comprises a first transistor circuit coupled between the first rectifier circuit and the second control device and configured to receive the second DC voltage and to provide a power to both the second control device and the LED. The feedback control circuit further comprises a voltage divider coupled to the first transistor circuit to receive the second DC voltage and configured to provide the first portion and the second portion of the second DC voltage to the second control device to produce the feedback control signal to transmit to the first control device via the optocoupler circuit.

The transformer further comprises an auxiliary winding magnetically coupled to the primary winding. The buck circuit with the switching portion further comprises a voltage feedback circuit coupled to the auxiliary winding and configured to draw partial energy from the auxiliary winding to sustain operation of the first control device. The voltage feedback circuit further comprises a voltage regulator and a third diode whereas the voltage regulator comprises a first voltage reference and a second transistor configured to supply a voltage and a current to the first control device.

By adapting a proper switching frequency and a proper duty cycle to compensate the low-frequency ripple of the second DC voltage according to the feedback control signal, the buck circuit with the switching portion and the LED driving circuit can provide the third DC voltage with a constant output LED current required to operate the one or more LED arrays with a luminous flux that has a suppressed flicker. That is, the LED driving circuit ultimately produces the third DC voltage with a ripple-reduced LED driving current to drive the one or more LED arrays.

BRIEF DESCRIPTION OF THE DRAWINGS

Non-limiting and non-exhaustive embodiments of the present disclosure are described with reference to the following figures, wherein like names refer to like parts but their reference numerals differ throughout the various figures unless otherwise specified. Moreover, in the section of detailed description of the invention, any of a "primary", a "secondary", a "first", a "second", a "third", and so forth does not necessarily represent a part that is mentioned in an ordinal manner, but a particular one.

DETAILED DESCRIPTION OF VARIOUS EMBODIMENTS

Figure 1:
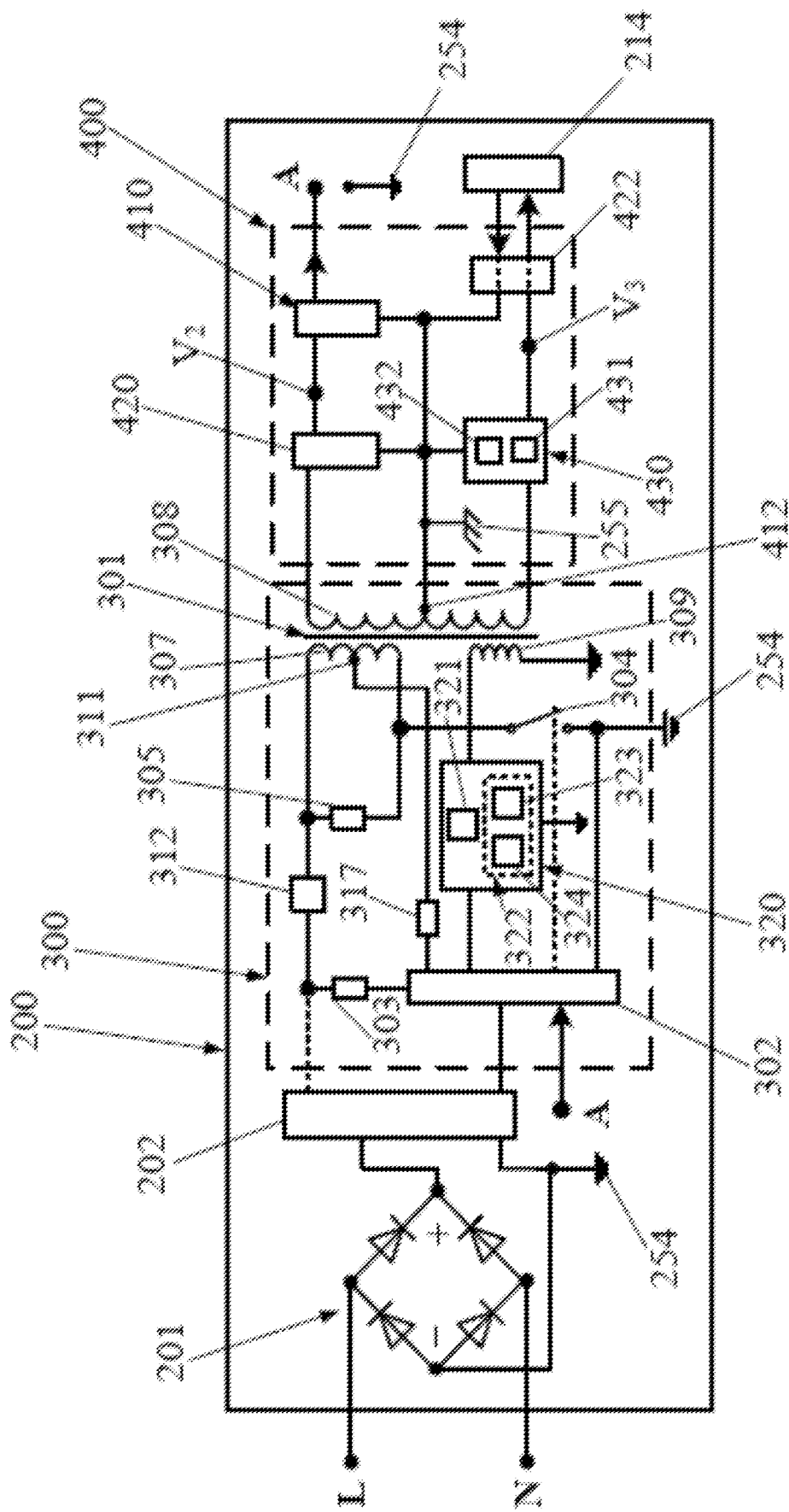
FIG. 1 is a block diagram of an LED luminaire according to the present disclosure.

FIG. 1 is a block diagram of an LED luminaire according to the present disclosure. The LED luminaire 200 comprises one or more LED arrays 214, a buck circuit with a switching portion 300, and an LED driving circuit 400. The LED luminaire 200 further comprises at least two electrical conductors "L'" and "N", a full-wave rectifier 201, and at least one input filter 202. The at least two electrical conductors "L'" and "N" are configured to couple to a line voltage from the AC mains. The full-wave rectifier 201 is configured to convert the line voltage into a first DC voltage.

The at least one input filter 202 is configured to suppress electromagnetic interference (EMI) noises. The buck circuit with the switching portion 300 comprises a transformer 301, a first control device 302, a first ground reference 254, a first electronic switch 304 and a second electronic switch 303 both controlled by the first control device 302, and a primary diode circuit 305. The second electronic switch 303 is configured to improve a power factor whereas the first electronic switch 304 is configured to modulate the first DC voltage into a variable DC voltage at a switching frequency. The transformer 301 comprises a primary winding 307, a secondary winding 308, and an auxiliary winding 309. When the first electronic switch 304 is closed, an input current flows into the primary winding 307 with energy stored in its increasing magnetic field, and the primary diode circuit 305 is reverse biased. When the first electronic switch 304 is opened, the primary diode circuit 305 conducts to generate energy pulses that can be transmitted to the secondary winding 308. That is to say that the primary diode circuit 305 is configured to generate energy pulses when the first electronic switch 304 is turned off. The first electronic switch 304 is a key of the buck circuit with the switching portion 300 to provide the variable DC voltage, a pulse width modulation (PWM) that can be used to accurately control an electric current through the primary winding 307, consequently regulating an output voltage and current.

In FIG. 1, the buck circuit with the switching portion 300 is coupled to the full-wave rectifier 201 via the at least one input filter 202 and configured to convert the first DC voltage into the variable DC voltage (i.e., a first PWM voltage with a duty cycle) at the switching frequency. The transformer 301 transforms the first PWM voltage into a second PWM voltage and a third PWM voltage on the secondary winding 308, respectively for use to generate a second DC voltage and a third DC voltage by the LED driving circuit 400. The LED driving circuit 400 comprises a second ground reference 255 electrically isolated from the first ground reference 254, a feedback control circuit 410, and a first rectifier circuit 420 and a second rectifier circuit 430 both coupled to the secondary winding 308 and sharing a common port 412 in the secondary winding 308. The common port 412 is coupled to the second ground reference 255. The first rectifier circuit 420 and the second rectifier circuit 430 are respectively configured to convert the variable DC voltage into the second DC voltage and the third DC voltage via the transformer 301 and a rectifier diode and a capacitor (not shown in FIG. 1 for simplicity) in each of the first rectifier circuit 420 and the second rectifier circuit 430. In other words, the rectifier diode and the capacitor in each of the first rectifier circuit 420 and the second rectifier circuit 430 are configured to respectively rectify and smooth out the second PWM voltage and the third PWM voltage in the secondary winding 308 into the second DC voltage and the third DC voltage. The second DC voltage is configured to produce a feedback control signal transmitted to the first control device 302 via the feedback control circuit 410 to control the switching frequency and the duty cycle of the first PWM voltage. The second DC voltage comprises a low-frequency variation (i.e., ripple) associated with the AC mains because the line voltage is sinusoidal at a nominal frequency of 50 Hz or 60 Hz. Both the second DC voltage and the third DC voltage are converted from the first PWM voltage and share the low-frequency variation in their provided voltages and currents. When the feedback control signal produced from the second DC voltage is transmitted to the first control device 302 to control the first electronic switch 304 on and off, the same variations are compensated, leading to the third DC voltage, which becomes regulated, and a reduced low-frequency current ripple to drive the one or more LED arrays 214 with a flicker-reduced light emission. In FIG. 1, the LED driving circuit 400 further comprises a port "A" with respect to the first ground reference 254, configured to couple to the first control device 302 to control the first electronic switch 304 on and off.

The buck circuit with the switching portion 300 further comprises a high voltage port 311 coupled to the primary winding 307, an input filter assembly 312, and a voltage feedback circuit 320 coupled to the auxiliary winding 309. The high voltage port 311 is configured to provide a startup voltage via a startup resistor 317 to operate the first control device 302. When the primary winding 307 is operating, the voltage feedback circuit 320 receives a power from the auxiliary winding 309 with an auxiliary voltage to sustain an operation of the first control device 302. The voltage feedback circuit 320 comprises a third diode 321 and a voltage regulator 322. The voltage regulator 322 comprises a first voltage reference 323 and a second transistor 324 configured to supply a voltage and a current to the first control device 302. When the startup voltage decreases due to its increased internal operations and controls, and when the auxiliary voltage is higher than the startup voltage and the first voltage reference 323, the third diode 321 in the voltage feedback circuit 320 conducts to supply a current to the voltage regulator 322, further sustaining operations of the first control device 302. The function of the voltage feedback circuit 320 is essential for the first control device 302 to operate properly because the buck circuit with the switching portion 300 has a wide range of operating voltages, for example, 110, 277, or 347 VAC from the AC mains in North America and because the line voltage from the AC mains goes to zero in each AC cycle. In the first control device 302, the startup resistor 317 is so designed to operate the buck circuit with the switching portion 300 at the lowest input voltage 110 VAC. When the highest voltage 347 VAC comes in, a higher proportional voltage appears at an input of the first control device 302. Therefore, an operating voltage for the first control device 302 must be in a wide range such as 11~35 VDC. The voltage feedback circuit 320 is thus needed to pump in energy in time and to sustain the operating voltage and to ensure no strobing occurred when the one or more LED arrays 214 is operating. That is, the voltage feedback circuit 320 is configured to draw energy from the auxiliary voltage to sustain operation of the first control device 302.

In FIG. 1, the LED driving circuit 400 further comprises a common-mode choke 422 coupled between the one or more LED arrays 214 and the second rectifier circuit 430 and configured to reduce a differential interference but to allow a ripple-reduced LED driving current to pass and to operate the one or more LED arrays 214. In this configuration, the ripple-reduced LED driving current flows from the second rectifier circuit 430 via a first coil in the common-mode choke 422 into the one or more LED arrays 214 and returns via a second coil in the common-mode choke 422 to the second ground reference 255, completing an energy transfer to the one or more LED arrays 214. Apparently, the second rectifier circuit 430 may comprise a second rectifier diode 431, an output capacitor 432, and an output resistor (not shown in FIG. 1 for simplicity).

In FIG. 1, the primary winding 307 is coupled to the input filter assembly 312 and also coupled to the first electronic switch 304. When the first electronic switch 304 is turned on by the first control device 302, a DC current enters the primary winding 307 to charge thereof. The primary diode circuit 305 comprises a free-wheeling diode (not shown), which does not conduct because of a reverse bias. When the second electronic switch 304 is turned off, the primary winding 307 reverses its polarity leading to a forward bias for the free-wheeling diode to conduct and to loop a current path for energy stored in the primary winding 307 to release, sustaining an inductor current in the primary winding 307, which can be transferred to the secondary winding 308 and the auxiliary winding 309 magnetically coupled to the primary winding 307, respectively building up a secondary voltage and an auxiliary voltage.

In FIG. 1, the buck circuit with the switching portion 300 comprises the first electronic switch 304 controlled by the first control device 302, the primary diode circuit 305, and the primary winding 307 with its current charging and discharging controlled by the first electronic switch 304. The first control device 302 is configured to detect zero current in the primary winding 307, to generate a zero current detection signal, and to control the first electronic switch 304 on and off with a constant on-time and a varied off-time controlled by the zero current detection signal. By adapting the switching frequency to compensate the low-frequency ripple of the second DC voltage so as to produce the third DC voltage with the ripple-reduced LED driving current, the LED driving circuit 400 can provide an output current required to operate the one or more LED arrays 214 with a luminous flux that has a suppressed flicker. The switching frequency is no less than 30 kHz to ensure a flicker frequency is very far out of low-frequency zone. Please note that the low-frequency flicker may be referred to a nominal flicker frequency of 100 Hz or 120 Hz, depending on a line frequency of the AC mains used. An average current in the primary winding 307 yields to the LED driving current in the second winding 308 with a reduced low-frequency current ripple.

Figure 2:
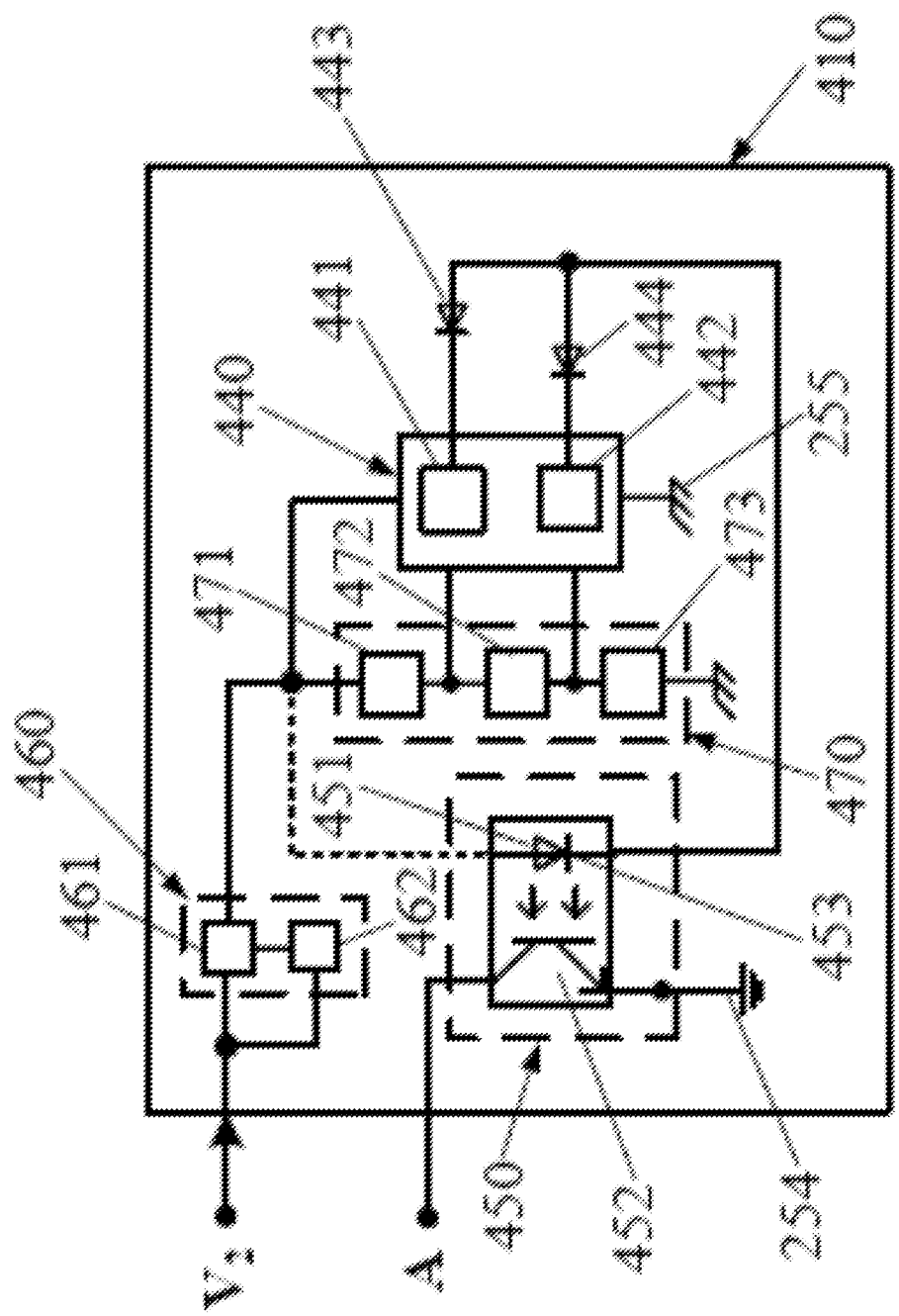
FIG. 2 is a block diagram of a feedback control circuit according to the present disclosure.

FIG. 2 is a block diagram of the feedback control circuit according to the present disclosure. The feedback control circuit 410 comprises a second control device 440 and an optocoupler circuit 450 coupled to the second control device 440. The optocoupler circuit 450 comprises an LED 451 and a photo-transistor 452 optically coupled to the LED 451. The LED 451 comprising a cathode 453 and is configured to receive the feedback signal from the second control device 440 to convert it into a light signal. The photo-transistor 452 is configured to convert the light signal into an electric signal and to send to the first control device 302 via the port "A" to control the variable DC voltage, ultimately regulating the third DC voltage according to a predetermined LED driving voltage and a predetermined LED driving current. The average current flowing in the secondary winding 308 yields to the reduced low-frequency current ripple.

In FIG. 2, the second control device 440 comprises a first operational amplifier 441 and a second operational amplifier 442. The first operational amplifier 441 receives a first portion of the second DC voltage and is configured to ultimately regulate the third DC voltage whereas the second operational amplifier 442 receives a second portion of the second DC voltage corresponding to an electric current associated with the second DC voltage and is configured to ultimately regulate an LED driving current associated with the third DC voltage to drive the one or more LED arrays 214. The feedback control circuit 410 further comprises a first diode 443 coupled to a first output of the first operational amplifier 441 and a second diode 444 coupled to a second output of the second operational amplifier 442. Each of the first diode 443 and the second diode 444 comprises an anode. The anode of the first diode 443 and the anode of the second diode 444 are electrically connected and further coupled to the cathode 453 of the LED 451 to control an electric current flowing in the LED 451.

The feedback control circuit 410 further comprises a first transistor circuit 460 coupled between the first rectifier circuit 420 (shown in FIG. 1) and the second control device 440 and configured to receive the second DC voltage and to provide a power to both the second control device 440 and the LED 451. The first transistor circuit 460 may comprise a transistor 461 and a second voltage reference 462 comprising a bias voltage resistor and a Zener diode (not shown). The feedback control circuit 410 further comprises a voltage divider 470 coupled to the first transistor circuit 460 and configured to provide the first portion and the second portion of the second DC voltage to the second control device 440 so as to produce the feedback control signal to feedback to the first control device 302 via the optocoupler 450. The voltage divider 470 may comprise three resistor assemblies 471, 472, 473 connected in series. Each of the three resistor assemblies 471, 472, 473 may comprise a resistor and a capacitor in parallel with the resistor.

Referring to FIG. 1 and FIG. 2, when the first electronic switch 304 is on, the input current flows into the primary winding 307. At the same time, the feedback control signal is sent to the first control device 302 to control the off-time of the first electronic switch 304. When the first electronic switch 304 is off, the primary diode circuit 305 is forward-biased, and the primary winding 307 discharges with a loop current flowing from the primary winding 307 and the primary diode circuit 305, back to the primary winding 307. The feedback control signal keeps track of the output current and feedbacks to the first control device 302 to continuously control the first electronic switch 304 on and off. The closed loop operation in both on-time and off-time of the first electronic switch 304 ensures the output current to be accurately controlled within 4%.

Figure 3:
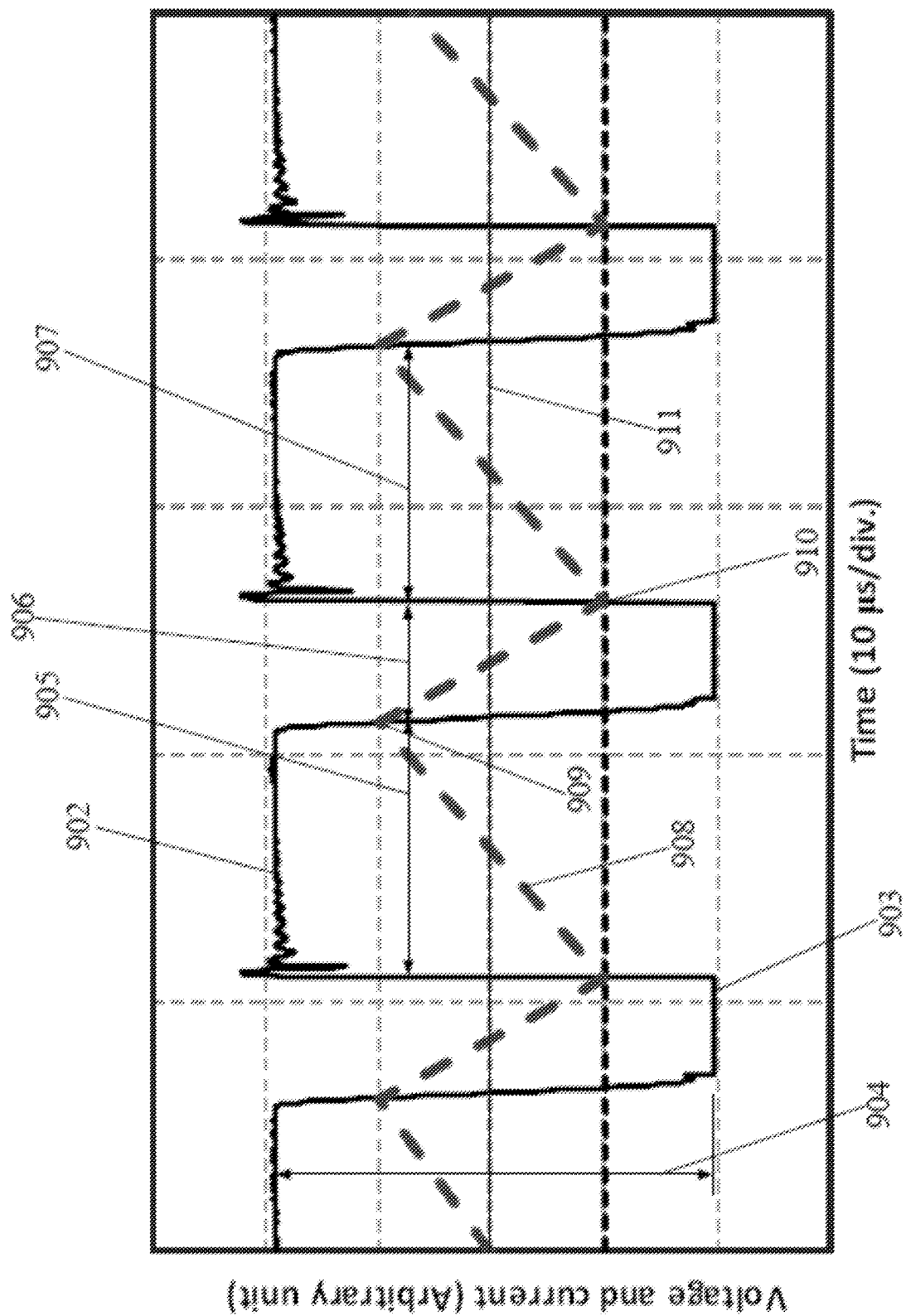
FIG. 3 is a waveform of a variable DC voltage measured according to the present disclosure.

FIG. 3 is a waveform of a variable DC voltage measured between the primary winding 307 (shown in FIG. 1) and the first ground reference 254 according to the present disclosure. Referring to FIGS. 1-2, when 120 V/60 Hz of the line voltage is applied, the bridge rectifier 201 outputs the first DC voltage with a ripple cycle of 8.33 milliseconds (ms), equivalent to a frequency of 120 Hz, twice the frequency of the line voltage to operate the buck circuit with the switching portion 300. The buck circuit with the switching portion 300 then converts the first DC voltage into the variable DC voltage. Referring to FIGS. 1-2, the primary winding 307 is charged when the first electronic switch 304 is on. A voltage difference between a high level 902 and a low level 903 represents a maximum input voltage swing. The waveform in FIG. 3 comprises multiple main pulses with a first width 905 of 10.5 microseconds (µs), a second width 906 of 4.7 µs, and a third width 907 of 10.5 µs. The first width 905 and the third width 907 represent the constant on-time. The second width 906 then represents the varied off-time. The primary winding 307 (in FIG. 2) is discharged when the first electronic switch 304 is off. As seen in FIG. 3, a primary winding current 908 increases linearly with the on-time from the zero current when charged, reaching the maximum inductor current ($I_{pk}$) at the end of the on-time 909, then starting to discharge from the maximum inductor current ($I_{pk}$) during off-time. At the end of discharge cycle 910, the primary winding current 908 decreases to zero, and the first control device 302 detects the zero current and turns on the first electronic switch 304 for a next charging cycle. An average inductor current 911 then represents a desired current to operate the transformer 301. For the line voltage 120 V applied, the on-time is fixed at 10.5 μs, whereas the off-time of the first electronic switch 304 varies as determined by the zero primary winding current. In FIG. 3, the off-time period 906 of 4.7 μs appears between the first width 905 and the third width 907. Thus, a corresponding switching frequency is 65.7 kHz. This means that hundreds of inductor charging cycles are used for each half cycle of the line voltage of 120 V from the AC mains. However, the switching frequency may slightly vary from 65.7 kHz because the off-time varies according to variations of a feedback control signal from an output voltage or further due to line voltage variations. In FIG. 3, a duty cycle of 69% gives a desired output voltage with a constant output current, yielding a regulated power to operate the one or more LED arrays 214 when the LED driving circuit 400 is operating. For a 277 VAC/60 Hz input, experimental results are similar to the ones depicted for 120 VAC with the constant on-time and a varied off-time.

Figure 4:
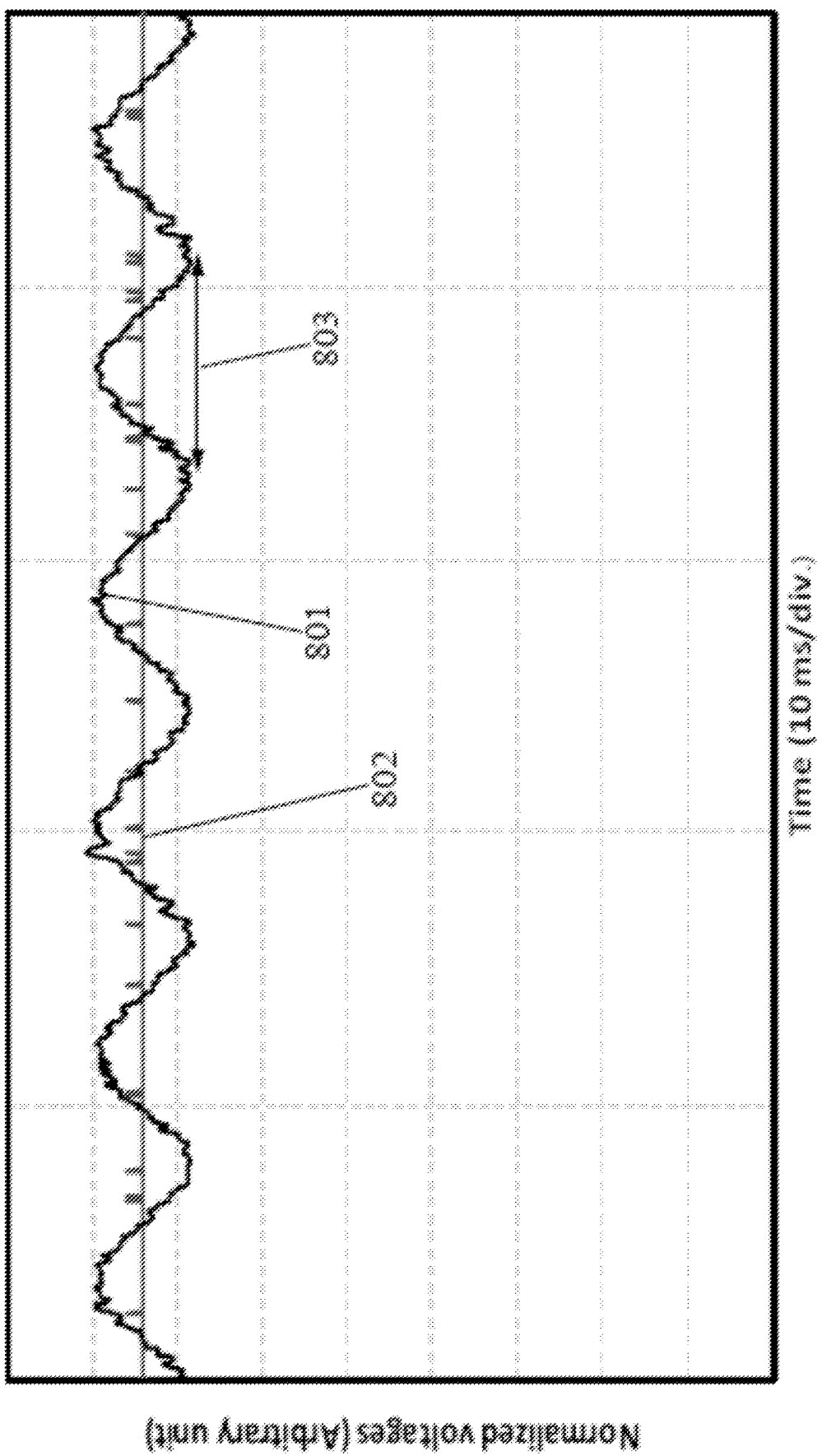
FIG. 4 is low-frequency ripple waveforms of an input voltage to a transformer and a third DC voltage measured according to the present disclosure.

FIG. 4 is low-frequency ripple waveforms of an input voltage to the transformer 301 and the third DC voltage measured according to the present disclosure. In FIG. 4, a first low-frequency voltage ripple waveform 801 of the input voltage to the transformer 301 is compared with a second low-frequency voltage ripple waveform 802 of the third DC voltage. The first low-frequency voltage ripple waveform 801 comprises a period 803, corresponding to a ripple frequency of 120 Hz, which is the low-frequency iterated in this disclosure. As computed, at least 38 dB of ripple voltage reduction for the third DC voltage over the input voltage to the transformer 301 is achieved. In other words, the input voltage to the transformer 301 has a significant low-frequency voltage ripple before compensation. However, after double compensations with the feedback control signal abstracted from the second DC voltage, the third DC voltage has a much less low-frequency voltage ripple. That is to say that the third DC voltage has the "reduced low-frequency voltage or current ripple" in comparison with the input voltage to the transformer 301. The reduced low-frequency voltage or current ripple is iterated in this disclosure.

Figure 5:
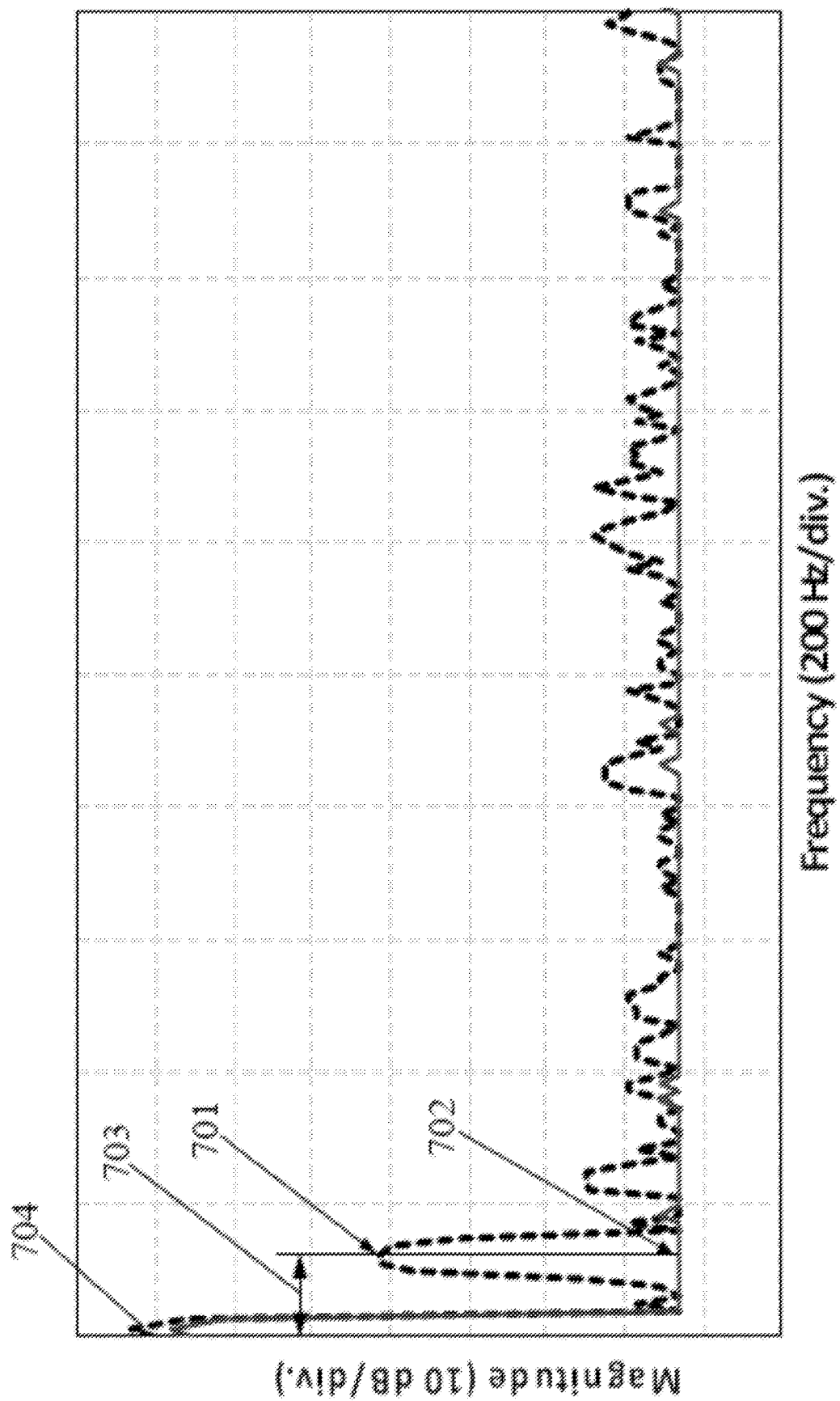
FIG. 5 is a fast Fourier transform (FFT) of the low-frequency ripple waveforms in FIG. 4 according to the present disclosure.

FIG. 5 is a fast Fourier transform (FFT) of the low-frequency ripple waveforms in FIG. 4 according to the present disclosure. In FIG. 5, a dotted FFT plot represents numerous frequency components in the first low-frequency voltage ripple waveform 801 of the input voltage to the transformer 301. As shown, a maximum 701 in the dotted FFT plot corresponds to a frequency 703 of 120 Hz whereas another maximum 704 in the dotted FFT plot corresponds to a DC with a frequency near 0 Hz. Relatively, a solid-line FFT plot of the second low-frequency voltage ripple waveform 802 of the third DC voltage follows a minimum 702 at the frequency of 120 Hz. As mentioned, at least 38 dB of ripple voltage reduction for the third DC voltage over the input voltage to the transformer 301 is achieved.

Figure 6:
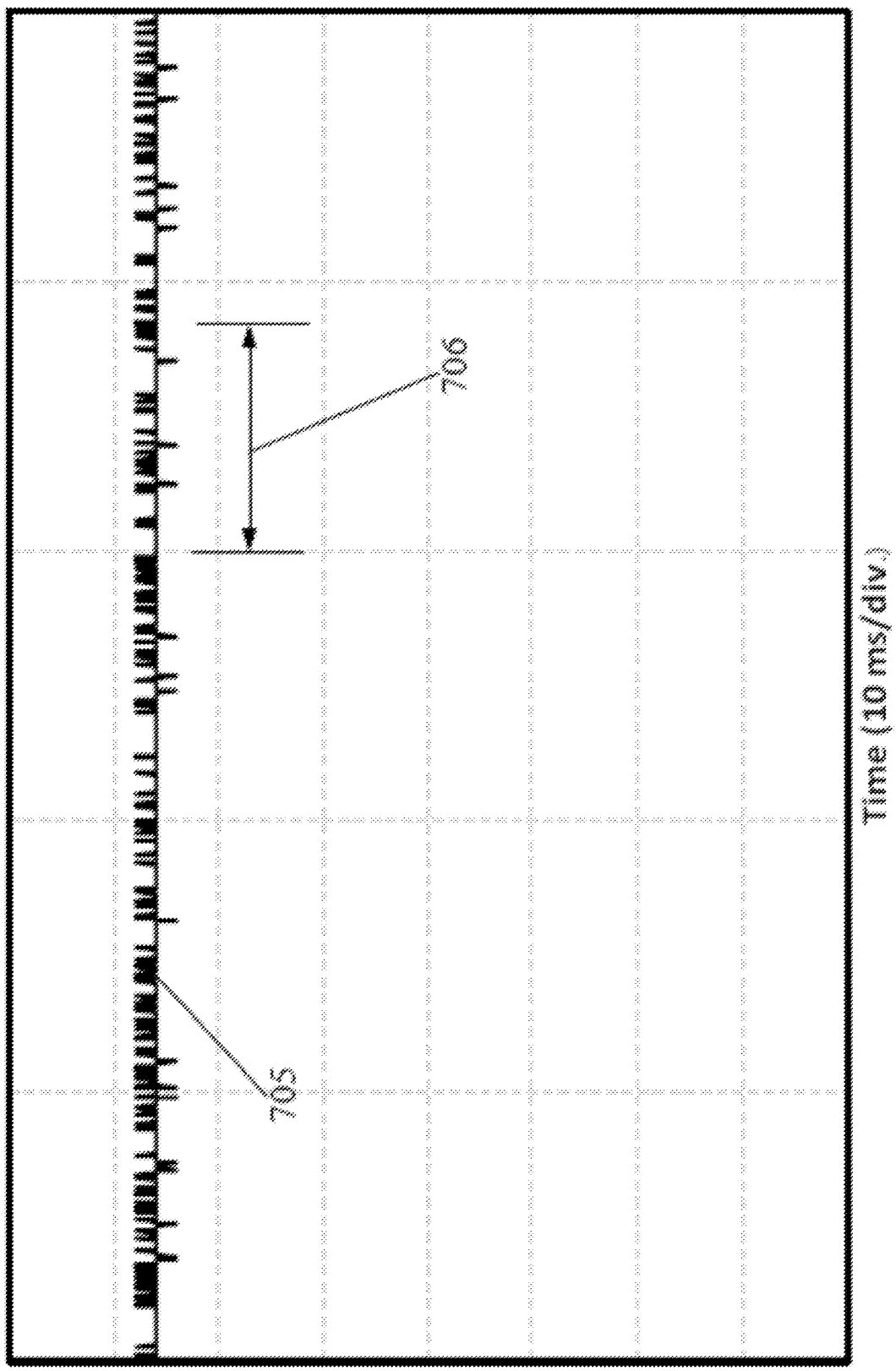
FIG. 6 is an example of a temporal light artifact of a light emission from a proposed LED luminaire according to the present disclosure.

FIG. 6 is an example of light flickering of a light emission from a proposed LED luminaire according to the present disclosure. The proposed LED luminaire adopts the buck circuit with the switching portion 300 and the LED driving circuit 400 depicted in FIG. 1 and the feedback control circuit 410 depicted in FIG. 2. In FIG. 6, a light output emission from a proposed LED luminaire is sampled and recorded over time in a plot of 705 with no appreciable maximum and minimum in any of a time interval 706 and no apparent flicker, where the time interval 706 represents 8.33 milliseconds. However, a flicker meter has been used to measure a percent flicker, which shows the percent flicker less than 6%. This means that double regulations of the third DC voltage and the LED driving current lead to an average current flowing in the secondary winding with the reduced low-frequency current ripple. Since the luminance of the one or more LED arrays 214 responds instantaneously to the LED driving current, the reduced low-frequency current ripple causes the luminous output with reduced low-frequency flickering.

Whereas preferred embodiments of the present disclosure have been shown and described, it will be realized that alterations, modifications, and improvements may be made thereto without departing from the scope of the following claims. Another LED driving circuit and feedback control circuit with an output voltage and current regulated in an LED-based luminaire using various kinds of combinations to accomplish the same or different objectives could be easily adapted for use from the present disclosure. Accordingly, the foregoing descriptions and attached drawings are by way of example only and are not intended to be limiting.

What is claimed is:

1. A light-emitting diode (LED) luminaire, comprising:
   one or more LED arrays;
   at least one full-wave rectifier configured to couple to alternate-current (AC) mains and convert a line voltage from the AC mains into a first direct-current (DC) voltage;
   a buck circuit with a switching portion comprising a first control device, a primary diode circuit, a first electronic switch controlled by the first control device and configured to modulate the first DC voltage into a variable DC voltage at a switching frequency, a transformer comprising a primary winding and a secondary winding, and a first ground reference; and
   an LED driving circuit comprising a second ground reference electrically isolated from the first ground reference, a feedback control circuit, and a first rectifier circuit and a second rectifier circuit both coupled to the secondary winding, wherein the first rectifier circuit and the second rectifier circuit are respectively configured to convert the variable DC voltage into a second DC voltage and a third DC voltage via the transformer, wherein the second DC voltage is configured to produce a feedback control signal transmitted to the first control device via the feedback control circuit, and wherein the third DC voltage is configured to drive the one or more LED arrays with a flicker-reduced light emission,
   wherein:
      the feedback control circuit comprises an optocoupler circuit comprising an LED and a photo-transistor optically coupled to the LED,
      the LED comprises a cathode and is configured to convert the feedback control signal into a light signal,
      the photo-transistor is configured to convert the light signal into an electric signal, and
      the optocoupler circuit is configured to provide an electrical isolation between the buck circuit with the switching portion and the LED driving circuit but to allow the feedback control signal to transmit.

2. The LED luminaire of claim 1, wherein the feedback control circuit further comprises a second control device coupled to the optocoupler circuit and configured to abstract voltage and current variations associated with the second DC voltage and the third DC voltage and to send to the first control device via the optocoupler circuit to compensate and to control the variable DC voltage, thereby regulating the third DC voltage according to a predetermined LED driving voltage and a predetermined LED driving current.

3. The LED luminaire of claim 2, wherein the second control device comprises a first operational amplifier and a second operational amplifier, wherein the first operational amplifier is configured to receive a first portion of the second DC voltage and to regulate the third DC voltage, wherein the second operational amplifier is configured to receive a second portion of the second DC voltage and to regulate an LED driving current to drive the one or more LED arrays, and wherein double regulations of the third DC voltage and the LED driving current lead to an average current flowing in the secondary winding with the reduced low-frequency current ripple.

4. The LED luminaire of claim 3, wherein the feedback control circuit further comprises a first diode coupled to a first output of the first operational amplifier and a second diode coupled to a second output of the second operational amplifier, wherein each of the first diode and the second diode comprises an anode, and wherein the anode of the first diode and the anode of the second diode are electrically connected and further coupled to the cathode of the LED to control an electric current flowing in the LED.

5. The LED luminaire of claim 1, wherein the LED driving circuit is further configured to drive the one or more LED arrays with the flicker-reduced light emission with a percent flicker less than 6% at a nominal flicker frequency of 100 Hz or 120 Hz.

6. The LED luminaire of claim 1, wherein, responsive to detecting zero current in the primary winding, the first control device is configured to generate a zero current detection signal to control the first electronic switch on and off with a constant on-time and a varied off-time with a duty cycle controlling the third DC voltage and the LED driving current via the transformer to drive the one or more LED arrays.

7. The LED luminaire of claim 6, wherein the feedback control circuit is further configured to control the switching frequency and the duty cycle to compensate a low-frequency voltage ripple of the second DC voltage, consequently producing the third DC voltage with a ripple-reduced LED driving current to drive the one or more LED arrays.

8. The LED luminaire of claim 1, wherein the switching frequency is no less than 30 kHz.

9. The LED luminaire of claim 1, wherein the primary diode circuit is coupled between two terminals of the primary winding and configured to generate energy pulses in the primary winding and to yield the variable DC voltage with a constant current control.

10. The LED luminaire of claim 1, wherein the LED driving circuit further comprises an output capacitor and a common-mode choke coupled between the output capacitor and the one or more LED arrays and configured to reduce a differential interference but to allow the LED driving current to pass and to operate the one or more LED arrays with the flicker-reduced light emission.

11. The LED luminaire of claim 2, wherein the feedback control circuit further comprises a first transistor circuit coupled between the first rectifier circuit and the second control device and configured to receive the second DC voltage and to provide a power to both the second control device and the LED.

12. The LED luminaire of claim 11, wherein the feedback control circuit further comprises a voltage divider coupled to the first transistor circuit to receive the second DC voltage and configured to provide the first portion and the second portion of the second DC voltage to the second control device to produce the feedback control signal to transmit to the first control device via the optocoupler circuit.

13. The LED luminaire of claim 1, wherein the transformer further comprises an auxiliary winding magnetically coupled to the primary winding, and wherein the buck circuit with the switching portion further comprises a voltage feedback circuit coupled to the auxiliary winding and configured to draw energy from the auxiliary winding to sustain operation of the first control device.

14. The LED luminaire of claim 13, wherein the voltage feedback circuit comprises a third diode and a voltage regulator, and wherein the voltage regulator comprises a first voltage reference and a second transistor configured to supply a voltage and a current to the first control device.

\* \* \* \* \*